D. L. GARVER.
Harrow.

No. 95,458.    Patented Oct. 5, 1869.

Witnesses
Harry Cox
Henry J. Metz

Inventor:
David L. Garver.
by Theo. Mungen.
his Attorney.

UNITED STATES PATENT OFFICE.

DAVID L. GARVER, OF HART, MICHIGAN.

IMPROVEMENT IN HARROWS.

Specification forming part of Letters Patent No. 95,458, dated October 5, 1869.

*To all whom it may concern:*

Be it known that I, DAVID L. GARVER, of Hart township, in the county of Oceana and State of Michigan, have invented certain Improvements in Harrows, of which the following is a specification.

My invention relates to the construction of harrow-teeth of spring steel, and of such form that when attached to an ordinary harrow-frame they will curve back over the bars of the frame, pass between them, and extend to the ground, their points inclining forward.

The objects accomplished by my invention are the following, viz: When a tooth strikes any solid substance, it rebounds or springs back and upward; thereby clearing the substance, and immediately enters the ground again, without interfering with the working of the other teeth. Frequent clogging is avoided, and the harrow can be moved from place to place as readily as a common sled by simply turning it over.

Figure 1:
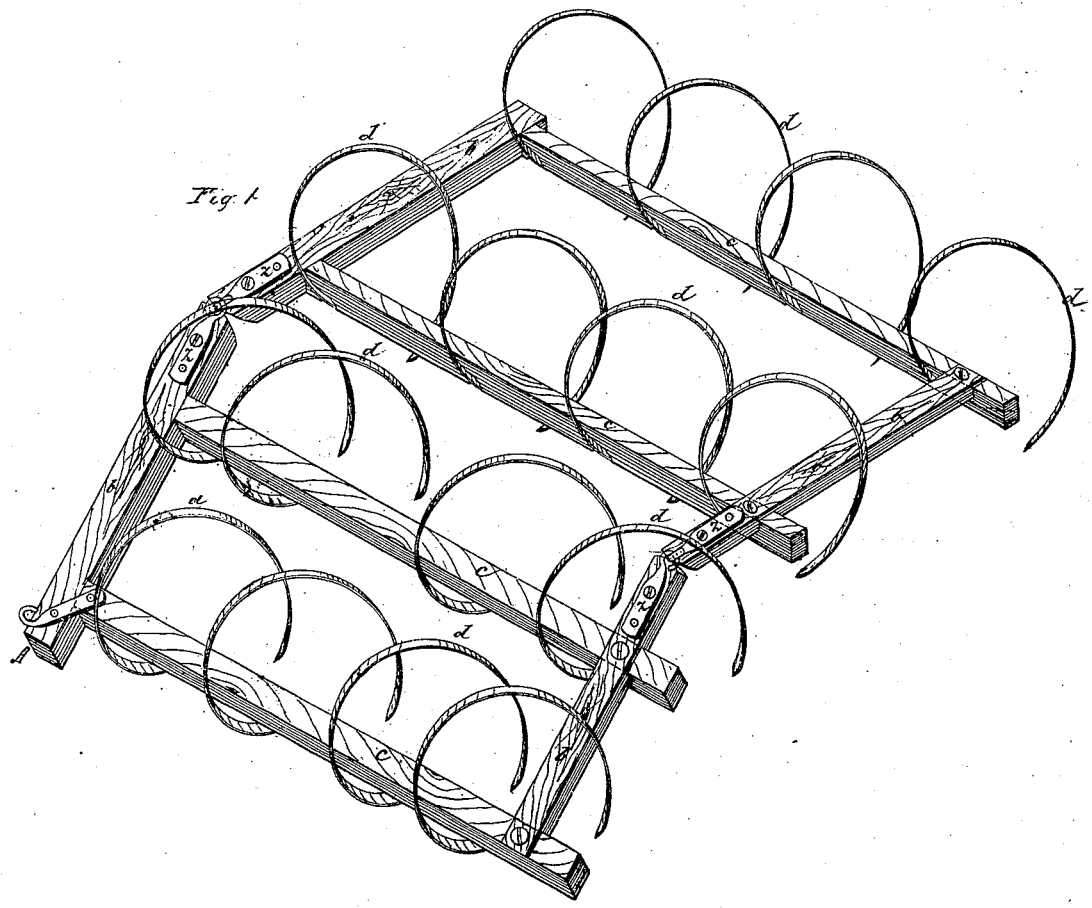
Figure 2:
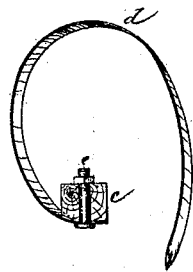
Figure 3:
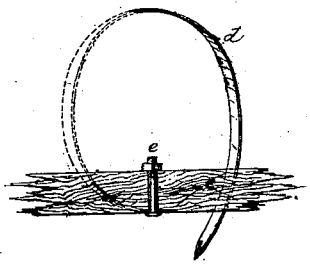

In the accompanying drawings, Fig. 1 is a perspective view of a harrow provided with my improved harrow-teeth. Fig. 2 is a transverse sectional view of a beam of the harrow-frame, showing one tooth and its fastening. Fig. 3 is a longitudinal sectional view of a bar of the frame, also showing a tooth and its fastening.

A is a common harrow-frame, constructed lighter than the ordinary teeth require it to be, and provided with hinges $z$ at the sides $b$.

$c$ are bars, to the under side of which the teeth $d$ are attached. The teeth $d$ are made of spring-steel, about four feet in length, two inches in width, and one-fourth of an inch in thickness, having their points swaged in the shape of common cultivator-teeth. The teeth are then bent in a circular shape, their points being about eight inches to the rear and extending about five or six inches below their ends. Their ends are fastened to the bar $c$ by being let into the bar on the under side, so as to be even with the under surface, and are there firmly held by one or more iron bolts, $e$, provided with nut and screw, as shown in Figs. 2 and 3. The points of the teeth incline forward and extend five or six inches below the under side of the frame The dimensions of the teeth depend entirely upon the nature of the soil for which they are intended. If used in light sandy soil, they may be constructed shorter; if in a clay soil, they should be stiffer; and if in rough rooty stony ground, they should be longer than I have described them. The shape or kind of frame, or the number of teeth used, are matters of choice. Sixteen teeth are enough for a medium-sized harrow.

The construction of the teeth admits of the frame being made lighter than the frame of an ordinary harrow. Their points inclining forward, they have a tendency to enter the ground when the harrow is drawn, and this tendency obviates the necessity of a heavy frame.

I claim as my invention—

The circular-shaped harrow-tooth $d$, constructed and used in the manner and for the purpose herein specified.

DAVID L. GARVER.

Witnesses:
BURGAVRA N. HUFF,
JUDSON PALMITER.